Aug. 17, 1965
J. L. BUCHANAN ETAL
3,201,679
SOLID-STATE CONTROLLED RECTIFIER VOLTAGE REGULATING SYSTEM
Filed Nov. 15, 1962
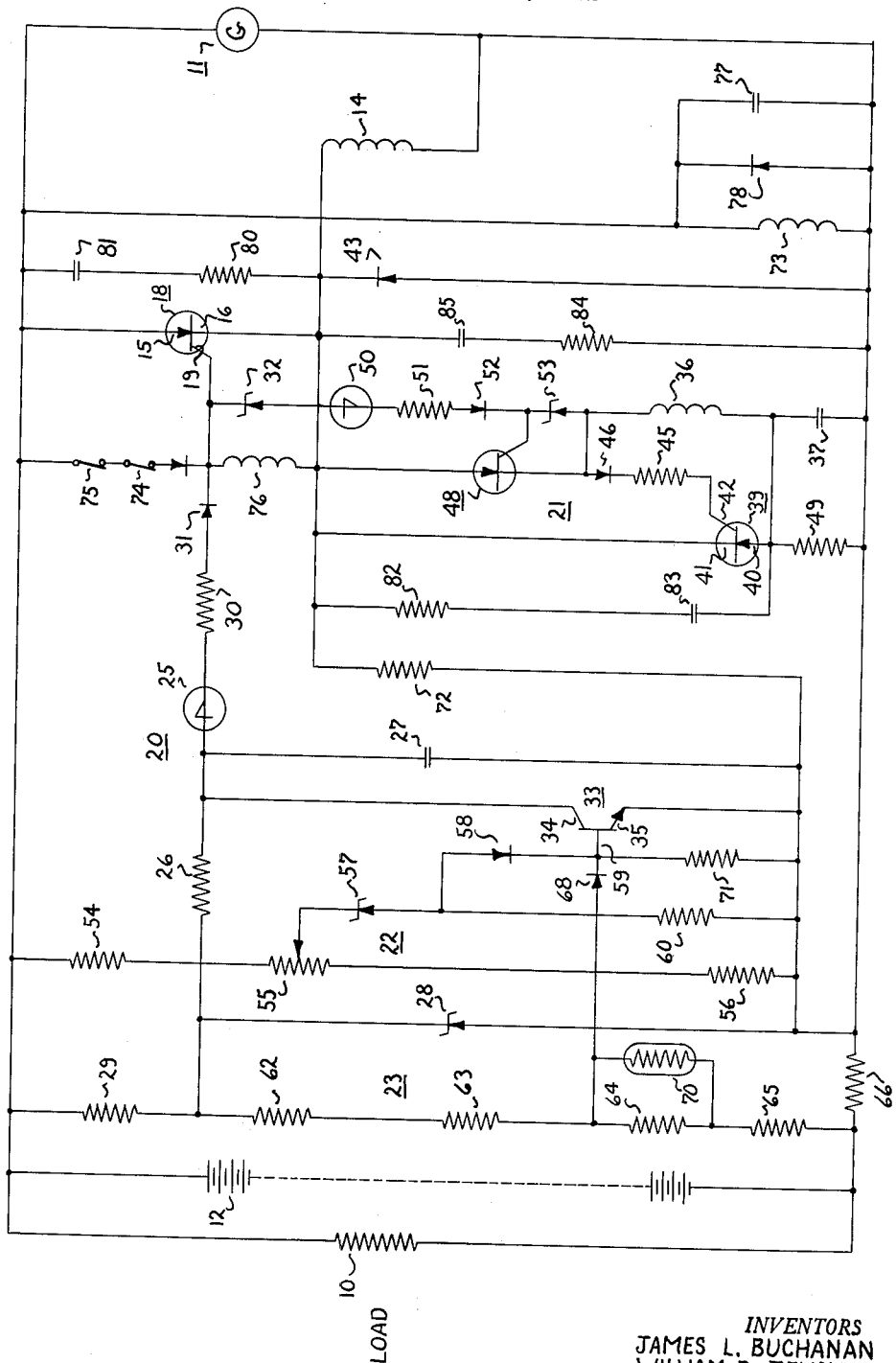
INVENTORS
JAMES L. BUCHANAN
WILLIAM B. ZELINA
BY
THEIR ATTORNEY

United States Patent Office 3,201,679
Patented Aug. 17, 1965

3,201,679
SOLID-STATE CONTROLLED RECTIFIER VOLTAGE REGULATING SYSTEM
James L. Buchanan and William B. Zelina, Erie, Pa., assignors to General Electric Company, a corporation of New York
Filed Nov. 15, 1962, Ser. No. 237,803
5 Claims. (Cl. 322—25)

This invention relates to voltage regulating systems for variable speed dynamoelectric machines and particularly to such systems employing static circuitry for regulating the voltage of axle or engine driven direct current generators. The invention is especially applicable to the field control of battery charging generators of the type employed on vehicles such as locomotives, and will be particularly described in that connection.

An application Serial No. 237,796 filed concurrently herewith, there is disclosed a new and improved controlled rectifier system and new and improved control and commutation circuits therefor. While the present invention incorporates many of the features of the above referenced controlled rectifier system, it adds additional features to provide a new and improved voltage regulator system for controlling the output voltage of direct current generators.

A wide variety of self-excited direct current generators are currently utilized in battery charging systems on locomotives. In the direct current generators of these many systems, such parameters as generator shunt field resistance and speed and load range vary widely. The desirability and advantages of a voltage regulating system applicable, interchangeably, to such a wide variety of direct current generators is well recognized in the art.

It is a general object of this invention, therefore, to provide a new and improved voltage regulating system for variable speed direct current generators which involves a minimum of equipment, and is simple, economical and reliable in operation.

It is another object of this invention to provide a solid-state voltage regulating system for accurately controlling generator voltage and limiting current to any desired level and which system may be adapted to a wide variety of direct current generators without requiring adjustment or modification.

Briefly stated, in accordance with one aspect of this invention, we provide a new and improved controlled rectifier voltage regulating system for controlling the output voltage of a direct current generator by control of the average power supplied to the shunt field winding thereof. The system comprises a solid-state controlled rectifier having an anode, a cathode and a control electrode and means for connecting the generator output voltage in series with the anode-cathode elements and the shunt field winding of the generator. The system also includes a variable-frequency relaxation oscillator control circuit including a multi-layer semiconductor diode for applying a gating signal directly to the control electrode of sufficient magnitude to initiate conduction in the controlled rectifier. First and second circuit means are provided for developing control feed-back signals indicative respectively of the deviation in output voltage and output current from a preset value and for utilizing such signals to vary the repetition rate of the relaxation oscillator of the control circuit. The system further includes a commutation circuit means shunting the field winding of the generator for rendering the controlled rectifier nonconducting a fixed time after initiation of conduction therein and including means for recycling the commutation circuit upon commutation failure.

The novel features believed characteristic of the invention are set forth with particularity in the appended claims. The invention itself, however, both as to its organization and method of operation, together with further objects and advantages thereof, may best be understood by reference to the following description taken in connection with the accompanying drawing in which the sole figure thereof shows a detailed schematic circuit diagram of a voltage regulating system in accordance with this invention.

In the drawing a load circuit, designated schematically as a resistance 10, is arranged to be supplied energy from a direct current generator 11 connected thereto. Storage batteries 12 are also connected to the generator output and arranged to be charged thereby. The output voltage of generator 11 is arranged to be regulated to a preset value by controlling the average power supplied to the shunt field winding 14 which is connected in series with the anode 15 and cathode 16 of a solid-state controlled rectifier 18 across the output of generator 11. Controlled rectifier 18 is rendered conductive when a suitable positive voltage is applied to its control electrode 19.

Field current control is provided by controlling the average conduction time of controlled rectifier 18 through variation of the delay time between conduction periods of fixed time duration. The conduction periods of fixed time duration are provided by the control circuit means 20, which operates to initiate conduction in controlled rectifier 18, and commutation circuit 21, which operates to terminate conduction of controlled rectifier 18 a fixed time after initiation of conduction therein. The delay time between conduction periods is determined by the repetition rate of the gating signals from control circuit 20. The repetition rate of the gating signals is controlled by a transistor in response to feed-back signals, developed by voltage control circuit 22 and current limiting circuit 23, which are indicative of the deviation in generator output voltage from a preset value.

Control circuit 20 comprises a variable-repetition rate relaxation oscillator which includes a multi-layer semiconductor diode device 25 which exhibits a high impedance below a minimum switching voltage and a lower impedance above such switching voltage. Preferably, diode device 25 is a four-layer diode or so-called Shockley diode which exhibits an extremely low impedance above the minimum switching voltage thereof. Diode device 25 is connected through the combination of resistance 26 and capacitance 27 between control electrode 19 and the direct current oscillator voltage supply. The oscillator voltage supply is provided by a breakdown diode 28, heavily biased by a series resistance 29, connected across the output of generator 11. A resistance 30 and rectifier 31 in series with multi-layer diode device 25 protect the control electrode circuit of controlled rectifier 18 from excessive forward and reverse currents respectively while breakdown diode 32 protects the control electrode from over-voltage.

The repetition rate of the relaxation oscillator is controlled by a transistor 33 whose collector 34 and emitter 35 are connected across capacitance 27.

Commutation circuit 21 includes a series resonant circuit consisting of inductance 36 and capacitance 37 arranged to be energized when controlled rectifier 18 is conducting. Capacitance 37 is arranged to be discharged into field winding 14 by a second controlled rectifier 39. The discharge of capacitance 37 operates to terminate conduction of controlled rectifier 18. The anode 40 of second controlled rectifier 39 is connected to the junction between the inductance 36 and capacitance 37 and the cathode 41 is connected to the cathode 16 of controlled rectifier 18. Controlled rectifier 39 is rendered conducting by the energy stored in capacitance 37 which is applied to control electrode 42. A "free wheeling" diode 43 shunting field 14 provides a low impedance path therethrough when controlled rectifiers 18 and 39 are nonconductive. The energy stored in capacitance 37 is also arranged to be applied to multi-layer diode device 25 to render the relaxation oscillator of control circuit 20 inoperative until the capacitance 37 discharges to a predetermined level.

The control electrode circuit of controlled rectifier 39 is protected from excessive forward and reverse currents by resistance 45 and diode 46 respectively. Diode 46 also prevents slow charging of capacitance 37.

Commutation circuit 21 also includes means for recycling in the event the capacitance 37 has discharged but such discharge has not terminated the conduction of controlled rectifier 18. To this end capacitance 37 is arranged to be isolated from the system by a third controlled rectifier 48 and discharged through a resistance 49. The control circuit for controlled rectifier 48 includes a multi-layer semiconductor diode 50 which provides that controlled rectifier 48 remain nonconducting until the voltage across capacitance 37 is less than the voltage across field 14 by an amount equal to the minimum switching voltage of the diode 50. Capacitance 37 is thus isolated from the system and allowed to discharge through resistance 49. This prevents capacitance 37 from becoming "stalled" at system voltage. The control electrode of controlled rectifier 48 is protected from excessive forward and reverse currents by resistance 51 and diode 52 respectively, and from over-voltage by a breakdown diode 53.

The voltage control circuit 22 includes a voltage divider consisting of resistances 54, 55 and 56 connected across the generator output. The voltage of the divider is arranged to be applied to a reference circuit including a breakdown diode 57 and the base-to-emitter circuit of transistor 33. A diode 58 in series with the base 59 of transistor 33 provides isolation between the voltage control circuit 22 and the current limiting circuit 23. A resistance 60 provides a leakage path for diode 57 to prevent the leakage current thereof from affecting transistor 33, such as by making it partially conducting at high temperatures. Resistance 55 is made variable to provide for adjustment around the nominal desired generator output voltage.

Breakdown type diode 57 can provide a reference voltage which is essentially independent of temperature. This is possible because the positive temperature coefficient of resistance of diode 57 is approximately equal to the negative temperature coefficients of resistance of diode 58 and the base-to-emitter barrier of transistor 33.

The current limiting circuit 23 includes a bias network consisting of resistances 62, 63, 64 and 65 connected in series across breakdown diode device 28, and a current measuring shunt 66 in series with the load. The voltage developed across resistances 64 and 65, together with the voltage across shunut 66, is applied through diode 68 to the base 59 of transistor 33. When this total voltage is sufficient to overcome the barrier voltages of transistor 33 and diode 68, transistor 33 is rendered conducting. Diode 68 also serve to isolate current limiting circuit 23 from voltage control circuit 22. A thermistor 70 shunting resistance 64 provides temperature compensation since the negative temperature coefficients of resistance of the barriers of diode 68 and transistor 33 are in the current measuring loop. A resistance 71 connected across the base-to-emitter circuit of transistor 33 provides a leakage path for diode 68 around transistor 33. Resistance 71 should be larger to avoid lowering the gain of the current measuring loop and also to prevent self-heating of thermistor 70, but not so large that the leakage current of diode 68 or transistor 33 is operative to render transistor 33 conductive. A resistance 72 connected from the cathode 16 to the negative side of the generator output provides for the maintenance of the required minimum holding current for controlled rectifier 18.

Since the generator output voltage resulting from residual field flux is not of sufficient magnitude to provide the power to operate control circuit 20, shunt field current must be supplied during generator build-up. To this end we provide a circuit means including a relay having a winding 73 connected across the generator output and contacts 74 and 75 connected in series with an impedance element, such as inductance 76, which presents a low resistance to direct current and a high impedance to the gating signal to prevent loading of the control circuit. The relay and inductance 76 are arranged to provide shunt field current and to initially render controlled rectifier 18 conductive. The relay contacts 74 and 75 are arranged to be shunted when controlled rectifier 18 is rendered conductive so that they are required to interrupt only a very small current when they open.

A capacitance 77 shunting the generator output is provided for supplying the step of current demanded by the rapid switching of controlled rectifier 18 to minimize the dip in generator voltage which would result if the sudden current demanded by field 14 were supplied from the generator armature. Negative voltage transients are passed by a diode 78 shunting capacitance 77.

Reverse-voltage spike-suppression networks are provided for controlled rectifiers 18 and 39 and "free wheeling" diode 43 by the resistance-capacitance combinations consisting of resistance 80 and capacitance 81, resistance 82 and capacitance 83 and resistance 84 and capacitance 85, respectively.

As referred to hereinbefore, the generator output voltage resulting from residual field flux is not sufficient to provide the power to operate control circuit 20 which supplies gating signals to initiate conduction in controlled rectifier 18. During generator build-up, therefore, relay contacts 74 and 75 are closed. Generator build-up current flows through the relay contacts 74 and 75, inductance 76, and shunt field winding 14, until the voltage developed across inductance 76 is sufficient to initiate conduction in controlled rectifier 18. As shown, this shunts the relay contacts so that they are required to interrupt only a very low current when they open. The relay is used only during generator build-up to supply shunt field current and initially render controlled rectifier 18 conductive. At all other times the relay is out of the system.

The gradual increase of voltage across shunt field 14 during generator build-up does not provide the step input of voltage required to energize the series resonant circuit of commutation circuit 21. When the field voltage reaches the switching voltage of multi-layer diode device 50 in commutation circuit 21, however, diode 50 switches and initiates conduction in controlled rectifier 48 which provides the step voltage necessary to energize the series resonant circuit of inductance 36 and capacitance 37. The switching voltage of multi-layer diode 50 is higher than the voltage required to operate control circuit 20 so that as generator voltage builds up, the first commutation cycle operates to terminate conduction in controlled rectifier 18 after which initiation of conduction therein is controlled by control circuit 20.

Control circuit 20 comprises a transistor-controlled variable-frequency relaxation oscillator including the multi-layer diode device 25. Device 25 remains in a high impedance state until the forward voltage across it reaches the minimum switching voltage when it switches to a low impedance state. Capacitance 27 charges through resistance 26 from the voltage source provided by the heavily biased breakdown diode 28. The charging time, and hence the repetition rate of the relaxation oscillator, is determined by resistance 26, capacitance 27 and the degree to which transistor 33 is turned on.

As capacitance 27 charges, the voltage thereof is essentially across multi-layer diode device 25. When this voltage reaches the minimum switching voltage, diode device 25 switches to its low impedance state. The capacitance voltage then appears as a pulse from control electrode 19 to the negative side of the generator output and is of sufficient magnitude to initiate conduction in controlled rectifier 18.

With controlled rectifier 18 conductive, the generator output voltage is applied across the generator field 14. Since this voltage is from the cathode 16 to the negative side of the generator output, it operates to reverse bias multi-layer diode device 25 causing it to revert to its high impedance state. The relaxation oscillator is thus inoperative and remains that way until the voltage across the generator field 14 is reduced to a value equal to the difference between the voltage supplied by breakdown diode 28 and the minimum switching voltage of multi-layer diode device 25. This difference is the minimum power interlocking voltage of the system and operates to prevent controlled rectifier 18 from becoming conductive during commutation and immediately thereafter when forward voltage is being reapplied thereto.

The foregoing description has shown that multi-layer diode device 50 switches, to render controlled rectifier 48 conductive, when the field voltage reaches the switching voltage of diode 50. Therefore, since commutation circuit 21 shunts field winding 14, the generator output voltage is also applied through controlled rectifier 48 to the series resonant circuit of inductance 36 and capacitance 37. Current will be conducted in the forward direction for one-half cycle of the resonant frequency of the series resonant circuit. The other half cycle, however, since reverse current is blocked, operates to apply a gating signal to the control electrode 42 of controlled rectifier 39 rendering it conductive and allowing capacitance 37 to discharge into field winding 14. Since the energy stored in resonant capacitance 37 is approximately twice the system voltage it operates to reverse bias controlled rectifier 18 thereby terminating conduction therein.

The energy stored in capacitance 37 is also supplied to multi-layer diode device 25 and maintains the relaxation oscillator of control circuit 20 inoperative until capacitance 37 discharges to a value less than the difference of the voltage of breakdown diode 28 and the minimum switching voltage of multi-layer diode device 25. That is, the relaxation oscillator is rendered inoperative until the voltage at cathode 16 is less than the minimum power interlocking voltage.

The use of controlled rectifier 48, its associated control circuit, and the resistance 49 providing a discharge path for capacitance 37, provides for fail-safe commutation. This is accomplished by allowing the commutation circuit to recycle in the event that capacitance 37 has discharged through controlled rectifier 39 in normal manner but, for one reason or another, such discharge has failed to terminate conduction in controlled rectifier 18. It will be understood by those skilled in the art that there can be many external causes for failure to commutate.

In the commutation circuit of the above referenced copending application Serial No. 237,796 a step function of voltage is applied, through a diode device, to the series resonant circuit only when controlled rectifier 18 is rendered conductive, regardless of the system voltage. Therefore, should the energy stored in capacitance 37 be expended without terminating conduction in controlled rectifier 18, controlled rectifier 18 would remain conductive and capacitance 37 would remain charged to whatever system voltage resulted. That is, capacitance 37 would be "stalled" at this voltage.

In the present system, however, while the commutation circuit operates in a similar manner during charging, as described in detail above, controlled rectifier 48 is rendered nonconductive during discharge of capacitance 37 and cannot be rendered conductive again until the voltage of capacitance 37 is less than the voltage across the field by an amount equal to the switching voltage of multi-layer diode 50. For example, assume that the switching voltage of diode device 50 is 40 volts, controlled rectifier 48 cannot be rendered conductive until the capacitance voltage is 40 volts less than the voltage across the field. Therefore, if capacitance 37 "stalls" at system voltage, it is isolated from the system and discharges through resistance 49. When capacitance 37 discharges to that value, controlled rectifier 48 is rendered conductive, charging capacitance 37 to a voltage equal to its residual charge plus approximately twice the switching voltage of diode device 50. At the end of the charging cycle, the energy stored in the capacitance is discharged through controlled rectifier 39 and applied to the field in the manner described hereinbefore to terminate conduction in controlled rectifier 18.

For simplicity, the commutation circuit 21 may be viewed as a power relaxation oscillator wherein the time constant of resistance 49 and capacitance 37 is long compared to the period of the series resonant circuit of inductance 36 and capacitance 37, but short compared to the time constant of the generator field. Should a commutation failure occur, therefore, the next commutation takes place before the effect of such failure can be realized in the generator output.

Thus, the conduction periods of controlled rectifier 18 are of fixed time duration determined by the resonant frequency of the series resonant combination of inductance 36 and capacitance 37. Since this resonant frequency is a function only of circuit parameters, the conduction periods are not affected by supply voltage or load current.

With the system operating and regulating voltage at the preset value and delivering current less than that necessary for current limit, there is a certain time delay between the application of gating signals to the control electrode of controlled rectifier 18. Under these conditions, the period between gating signals is determined by the frequency of the relaxation oscillator of control circuit 20.

Should the output voltage rise slightly, this voltage when compared with the reference voltage of the voltage control circuit 22 causes more current to flow into the base of transistor 33 thereby decreasing the frequency of the relaxation oscillator. This results in an increase in the delay time between the fixed time duration conduction periods of controlled rectifier 18 and a decrease in the average power supplied to field winding 14. The decrease in average power to field winding 14 reduces the generator output voltage to the preset value.

Similarly, should the generator current increase due to increased load to the point where the total voltage developed across the bias network of current limiting circuit 23 and current measuring shunt 66 exceeds the barriers of transistor 33 and diode 68, more current would flow into the base of transistor 33 again resulting in a decrease in generator output voltage. The generator output voltage drops to a level necessary to maintain a predetermined voltage across current measuring shunt 66. Since, if the ouput voltage decreases slightly from the regulated value the voltage control is no longer effective, there is a very sharp transition from voltage to current control and vice versa.

While this invention has been described hereinbefore with respect to a specific embodiment thereof, many changes and modifications will occur to those skilled in the art. It, therefore, is to be understood that the appended claims are intended to cover all such changes and modifications as fall within the true spirit and scope of the invention.

What we claim as new and desire to secure by Letters Patent of the United States is:

1. A system for regulating the voltage and limiting the current of a direct current generator to a preset value by controlling the power supplied to the shunt field winding thereof, comprising:

(a) a solid-state controlled rectifier having an anode, a cathode and a control electrode;

(b) means for connecting the generator output in series with said shunt field winding and the anode-cathode elements of said controlled rectifier;
(c) variable-frequency relaxation oscillator control circuit means including a multi-layer semiconductor diode device for applying a gating signal directly to said control electrode of sufficient amplitude to initiate conduction in said controlled rectifier;
(d) circuit means including a relay for supplying shunt field current and for initially rendering said controlled rectifier conductive during generator build-up;
(e) commutation circuit means shunting said field winding for terminating conduction in said controlled rectifier a fixed time after initiation of conduction therein, said means comprising
   a series resonant inductance-capacitance circuit,
   a second solid-state controlled rectifier having an anode, a cathode and a control electrode,
   means connecting said series resonant circuit and the anode-cathode elements of said second controlled rectifier in series circuit with the anode-cathode elements of said first controlled rectifier,
   means for applying a gating signal to the control electrode of said second controlled rectifier when the voltage across said field winding exceeds a predetermined level for rendering said second controlled rectifier conductive and energize said series resonant circuit,
   means including a third solid-state controlled rectifier adapted to be rendered conductive by the energy stored in said capacitance for discharging said capacitance into said field winding thereby terminating conduction in said first and second controlled rectifiers,
   and a resistance shunting said capacitance providing a second discharge path therefor,
   the time constant of said resistance-capacitance combination being long compared to the frequency of said series resonant circuit and short compared to the time constant of said field winding;
(f) first and second circuit means for developing control feedback signals indicative respectively of the deviation in the generator output voltage and current from preset values;
(g) and means for applying said feed-back signals to said control circuit to vary the repetition rate of the gating signals applied to the control electrode of said first controlled rectifier.

2. A voltage regulating system comprising:
(a) a first solid-state controlled rectifier having an anode, a cathode and a control electrode;
(b) means for connecting the anode-cathode elements of said controlled rectifier in series with the output of a direct current generator and the shunt field winding thereof;
(c) variable-frequency relaxation oscillator control circuit means including a multi-layer semiconductor diode device for applying a gating signal directly to said control electrode of sufficient amplitude to initiate conduction in said controlled rectifier;
(d) circuit means including a relay and an inductance for supplying shunt field current and for initially rendering said controlled rectifier conductive during generator build-up,
   the contacts of said relay being connected from the anode to the control electrode and said inductance being connected from the control electrode to the cathode respectively of said controlled rectifier;
(e) commutation circuit means shunting said field winding for terminating conduction in said first controlled rectifier a fixed time after initiation of conduction therein,
said means comprising
   a series resonant inductance-capacitance circuit,
   a second solid-state controlled rectifier having an anode, a cathode and a control electrode,
   means connecting said series resonant circuit and the anode-cathode elements of said second controlled rectifier in series circuit with the anode-cathode elements of said first controlled rectifier,
   means for applying a gating signal to the control electrode of said second controlled rectifier when the voltage across said field winding exceeds a predetermined level for rendering said second controlled rectifier conductive and energizes said series resonant circuit,
   a third controlled rectifier adapted to be rendered conductive by the energy stored in said capacitance for discharging said capacitance into said field and reverse biasing said first and second controlled rectifiers,
   and a resistance shunting said capacitance providing a second discharge path therefor;
(f) first and second circuit means for developing control feed-back signals indicative respectively of the deviation in generator output voltage and current from preset values;
(g) and means for applying said feed-back signals to said control circuit to vary the repetition rate of the gating signals applied thereby to the control electrode of said first controlled rectifier.

3. A system for regulating the voltage and limiting the current of a direct current generator by controlling the power supplied to the shunt field winding thereof comprising:
(a) a solid-state controlled rectifier having an anode, a cathode and a control electrode;
(b) means for connecting the generator output voltage in series with the anode-cathode elements of said controlled rectifier and said shunt field winding of said generator;
(c) variable frequency relaxation oscillator control circuit means including a multi-layer semiconductor diode device for applying a gating signal directly to said control electrode of sufficient amplitude to initiate conduction in said controlled rectifier;
(d) circuit means including a relay and an impedance element adapted to present a low resistance to direct current and a high impedance to said gating signals for supplying shunt field current and initially rendering said controlled rectifier conductive during generator build-up;
(e) commutation circuit means shunting said field winding for terminating conduction in said controlled rectifier a fixed time after initiation of conduction therein,
said commutation circuit means comprising a series resonant inductance-capacitance circuit,
   a second solid-state controlled rectifier having an anode, a cathode and a control electrode,
   means connecting said series resonant circuit and the anode-cathode elements of said second controlled rectifier in series circuit with the anode-cathode elements of said first controlled rectifier,
   means for applying a gating signal to the control electrode of said second controlled rectifier when the voltage across said field winding exceeds a predetermined level,
   a third solid-state controlled rectifier, means for rendering said third controlled rectifier conductive from the energy stored in said capacitance so that said capacitance is discharged into said field winding reverse biasing and terminating the conduction of said first and second controlled rectifiers,
and means providing a second discharge path to allow said capacitance to discharge to a predetermined level before said second controlled rectifier may be again rendered conductive;
(f) first and second circuit means for developing control feed-back signals indicative respectively of the deviation in generator output voltage and current from preset values;
(g) and means for applying said feed-back signals to said control circuit to vary the repetition rate of the relaxation oscillator thereof.

4. The voltage regulating system of claim 3 wherein said impedance element is an inductance.

5. A voltage regulating system for a direct current generator comprising:
  (a) a first controlled rectifier having an anode, a cathode and a control electrode;
  (b) means connecting the anode-cathode elements of said controlled rectifier in series with the output of said direct current generator and the shunt field winding thereof;
  (c) first and second circuit means for developing control feed-back signals indicative of deviations in generator output current and voltage respectively from preselected levels;
  (d) firing circuit means for applying gating signals to the control electrode of said first controlled rectifier to initiate conduction therein and provide excitation for said shunt field winding;
  (e) means applying said control feed-back signals to said firing circuit means operative to vary the period between the application of said gating signals to the control electrode of said first controlled rectifier;
  (f) commutation circuit means for rendering said first controlled rectifier nonconducting a fixed time after initation of conduction therein, said commutation circuit means comprising
    a second controlled rectifier having an anode, a cathode and a control electrode,
    a series resonant inductance-capacitance circuit
    means connecting said series resonant circuit in series with the anode-cathode elements of said second controlled rectifier and said series combination in shunt with said shunt field winding,
    means including a voltage responsive device for applying a gating signal to the control electrode of said second controlled rectifier for energizing said series resonant circuit when the voltage across said shunt field winding exceeds the voltage across the capacitance of said series resonant circuit by a predetermined amount,
    and a third controlled rectifier arranged to be rendered conductive by the energy stored in said capacitance so that said capacitance is discharged into said shunt field winding thereby reverse biasing both said first and second controlled rectifiers;
  (g) and means for supplying current to said shunt field winding and for initially rendering said first controlled rectifier conducting during build-up of the output voltage of said direct current generator.

References Cited by the Examiner
UNITED STATES PATENTS 3,008,082 11/61 Schlicher _____ 322—38
3,040,270 6/62 Gutzwiller _____ 307—88.5

LLOYD McCOLLUM, *Primary Examiner.*